US 6,720,955 B2

(12) United States Patent
Sugawara et al.

(10) Patent No.: US 6,720,955 B2
(45) Date of Patent: Apr. 13, 2004

(54) TRANSPARENT CONDUCTIVE LAMINATED BODY AND TOUCH PANEL

(75) Inventors: Hideo Sugawara, Ibaraki (JP); Tomonori Noguchi, Ibaraki (JP); Hidehiko Andou, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 246 days.

(21) Appl. No.: 10/062,916

(22) Filed: Jan. 31, 2002

(65) Prior Publication Data

US 2002/0158853 A1 Oct. 31, 2002

(30) Foreign Application Priority Data

Feb. 13, 2001 (JP) ....................... 2001-035387
Jan. 21, 2002 (JP) ....................... 2002-011800

(51) Int. Cl.$^7$ ................................ G09G 5/00
(52) U.S. Cl. .................................. 345/173
(58) Field of Search ................. 345/87, 173, 176; 349/56, 158; 359/254; 250/900

(56) References Cited

U.S. PATENT DOCUMENTS 4,072,864 A * 2/1978 von Gutfeld ............. 250/338.4
4,636,908 A * 1/1987 Yoshihara et al. ......... 361/321.4

FOREIGN PATENT DOCUMENTS

JP           6-222352           8/1994

* cited by examiner

Primary Examiner—Amare Mengistu
(74) Attorney, Agent, or Firm—Westerman, Hattori, Daniels & Adrian LLP

(57) ABSTRACT

A transparent conductive laminated body comprising a transparent dielectric substance thin film having two layers and furthermore a transparent conductive thin film being formed on one face of a transparent film substrate with thickness of 2 to 120 μm, and a transparent substrate being adhered on another face of the film substrate through a transparent pressure sensitive adhesive layer, wherein a relationship of $n3<n1<=n2<n4$ is satisfied where a light index of refraction of the film substrate is defined as $n1$, a light indexes of refraction of the two layers of the dielectric substance thin films are defined as $n2$ and $n3$ from the film substrate side respectively, and a light index of refraction of the conductive thin film is defined as $n4$ is excellent in transparency and scratch-proof property of the conductive thin film, and, moreover, excellent also in flexibility. A touch panel using the transparent conductive laminated body concerned has an improved dotting property.

11 Claims, 1 Drawing Sheet

TRANSPARENT CONDUCTIVE LAMINATED BODY AND TOUCH PANEL

BACKGROUND OF THE INVENTION

1. Field of the Invention

The present invention relates to a transparent conductive laminated body, which is transparent in visible light region, having a conductive thin film on a film substrate. The transparent conductive laminated body of the present invention is used in usages of transparent electrodes for new display methods applied liquid crystal displays, and electroluminescence displays and touch panels etc. besides and antistatic and electromagnetic wave interception, etc. for transparent goods.

2. Description of the Prior Art

As a conventional transparent conductive thin film, a so-called conductive glass in which indium oxide thin film is formed on a glass plate is known well, but since a substrate is made of glass, the conductive glass is inferior in flexibility and workability, and it is not suitable for a certain usage. Therefore, in recent years, a transparent conductive thin film in which various kinds of plastic films including polyethylene terephthalate film is used as substrate are often used in the light of advantages, such as, a flexibility and workability etc. in addition to excellent shock resistance and lightweight.

However, transparent conductive thin films using the film substrate have a problem that transparency is decreased because of a large light reflection factor on surface thereof, and also have a problem that electric resistance is increased or disconnection of circuits may occur because of blemish given while in use since the conductive thin film is inferior in scratch-proof property. Especially in conductive thin films for touch panels, a pair of films facing countered to each other through a spacer are strongly contacted at depressed dots from the panel board side of one of the pair, and therefore it is required for the films to have excellent durable characteristics resisting a strong depressing impact, that is, dotting property. However, since an excellent dotting property was not realized in the transparent conductive thin films using the above described film substrate, the films had a problem that only a short life as a touch panel could be realized.

In Japanese Patent Application Laid-Open No. 6-222352, A, as a solution for the above described problem, a method of obtaining a transparent conductive laminated body is proposed in which a film with a specific film thickness is used as a film substrate, and onto one face of the film a thin film of dielectric substance with a light index of refraction smaller than a light index of refraction of the film substrate is formed, and further a transparent conductive thin film is sequentially formed thereon, and moreover onto the other face of the film substrate another transparent substrate is adhered through a transparent pressure sensitive adhesive layer. In this transparent conductive laminated body, while transparency and scratch-proof property of the conductive thin film are improved, dotting property as a material for touch panels is also improved. Since the transparent conductive laminated body concerned is used in many cases in a state being flexed in touch panels etc., improvement in flexibility is further desired.

An object of the present invention is to provide a transparent conductive laminated body in which a conductive thin film is prepared on a film substrate, such as a polyethylene terephthalate film, and a laminated body that has outstanding transparency, scratchproof property of a conductive thin film, and also excellent flexibility. Furthermore, an object of the present invention is to provide a touch panel with improved dotting property using the transparent conductive laminated body concerned.

SUMMARY OF THE INVENTION

As a result of wholehearted research of the present inventors, it was found that the above described object is attained using the transparent conductive laminated body shown below to perform the present invention.

Namely the present invention relates to a transparent conductive laminated body comprising a transparent dielectric substance thin film having two layers and furthermore a transparent conductive thin film being formed on one face of a transparent film substrate with thickness of 2 to 120 $\mu$m, and a transparent substrate being adhered on another face of the film substrate through a transparent pressure sensitive adhesive layer, wherein a relationship of $n3<n1<=n2<n4$ is satisfied where a light index of refraction of the film substrate is defined as n1, a light indexes of refraction of the two layers of the dielectric substance thin films are defined as n2 and n3 from the film substrate side respectively, and a light index of refraction of the conductive thin film is defined as n4.

In the present invention, a dielectric substance thin film having a light index of refraction n3 smaller than a light index of refraction n1 of a film substrate is used between a film substrate and a conductive thin film, and on the other hand, a transparent substrate is prepared through a transparent pressure sensitive adhesive layer on another side of the film substrate to obtain an improved transparency of a transparent conductive laminated body and a scratch-proof property of the conductive thin film. Moreover the dielectric substance thin film has a structure containing two layers with a mutually different index of refraction, and optical properties may be improved and better flexibility as a dielectric substance thin film is also obtained as compared to a case where a thin film with an index of refraction smaller than an index of refraction of a film substrate is adopted, using a layer with an index of refraction n2 equal to an index of refraction n1 of a film substrate or greater than an index of refraction n1, and at the same time smaller than an index of refraction n4 of a conductive thin film as a layer in a side of the film substrate.

In the above described transparent conductive laminated body, it is preferable that the dielectric substance thin film with an index of refraction n2 is an organic substance or a mixture of an organic substance and an inorganic substance.

Moreover, in the above described transparent conductive laminated body, it is preferable that the dielectric substance thin film with an index of refraction n3 is an inorganic substance or of a mixture of an inorganic substance and an organic substance.

In the above described transparent conductive laminated body, a flexibility is improved, using an organic substance or a mixture of an organic substance and an inorganic substance as at least one layer of the two layers of dielectric substance thin films. Since an organic layer has better adhesion to film substrate, a dielectric substance thin film containing organic substance or a mixture of an organic substance and an inorganic substance may be preferably arranged on the substrate side.

Furthermore, the present invention relates to a touch panel in which a pair of panel boards with a conductive thin film is configured so that the conductive thin films face to each other through a spacer, wherein at least one panel board comprises the transparent conductive laminated body.

A durable property to inputting with pen (dotting property) of a touch panel using the above described transparent conductive laminated body may be improved, and at the same time flexibility may also be improved.

DETAILED DESCRIPTION OF THE INVENTION

Figure 1:
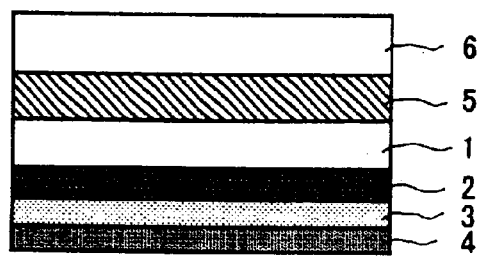
FIG. 1 is a sectional view showing an example of a transparent conductive laminated body of the present invention.
Figure 2:
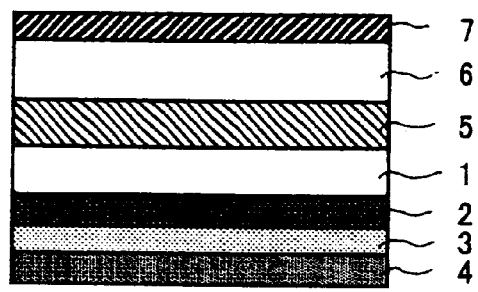
FIG. 2 is a sectional view showing other examples of a transparent conductive laminated body of the present invention.

Hereinafter, the present invention will be illustrated, referring to drawings. FIG. 1 shows an example of a transparent conductive laminated body of the present invention, transparent dielectric substance thin films 2 and 3 are formed on one face of a film substrate 1 and a transparent conductive thin film 4 is further formed on a transparent dielectric substance thin film 3, and a transparent substrate 6 is adhered on another face through a transparent pressure sensitive adhesive layer 5. Moreover, FIG. 2 shows other examples of a transparent conductive laminated body of the present invention, a hard coat processed layer 7 is formed on an outer face of the above described transparent substrate 6 shown in the above described FIG. 1, and other constitution is completely the same as that of FIG. 1.

Especially as film substrate 1 used in the present invention, there is no limitation, and various kinds of plastic films with transparency may be used. For example, as material, polyester derived resins, acetate derived resins, polyether sulfone derived resins, polycarbonate derived resins, polyamide derived resins, polyimide derived resins, polyolefin derived resins, (meth)acrylics derived resins, polyvinyl chloride derived resins, polyvinylidene chloride derived resins, polystyrene derived resins, polyvinyl alcohol derived resins, polyallyalte derived resins, polyphenylene sulfide derived resins, etc. may be mentioned. A light index of refraction n1 of a film substrate 1 is preferably about 1.4 to 1.7.

A thickness of these film substrates 1 is in a range of 2 to 120 $\mu$m. Especially, the thickness is suitably in a range of 6 to 100 $\mu$m. When the thickness is less than 2 $\mu$m, insufficient mechanical strength as a substrate is obtained, and difficulty occurs in operation when a roll-shaped dielectric substance thin film, conductive thin film and pressure sensitive adhesive layer are continuously formed from this substrate. On the other hand, when thickness exceeds 120 $\mu$m, an improvement in scratchproof property of the conductive thin film or in dotting property as touch panels that are demonstrated based on a cushioning effect of a pressure sensitive adhesive layer mentioned below may not be expected.

Etching processing, such as sputtering, corona discharging, flame processing, ultraviolet rays irradiation, electron ray irradiation, chemical conversion coating, oxidation, etc. and undercoat processing may be performed to the surface of the above described film substrate 1 beforehand in order to improve adhesion to the above described substrate of the dielectric substance thin film 2 that is to be prepared thereon. Moreover, before forming the dielectric substance thin film 2, dust removing and cleaning processing may be performed by solvent cleaning, ultrasonic cleaning etc., if needed.

The transparent dielectric substance thin films 2 and 3 formed on one face of the above described film substrate 1 have a light index of refraction n2 and n3 respectively. Each of the indexes of refraction n2 and n3 of the dielectric substance thin films 2 and 3 is smaller than a light index of refraction n4 of a conductive thin film 4 prepared on the dielectric substance thin film 3, and since the light index of refraction n4 of the conductive thin film 4 is usually approximately two, in the case, the light index of refraction n2 and n3 of the dielectric substance thin films 2 and 3 are usually approximately 1.3 to 1.9. Moreover, refractive indexes n2 and n3 satisfy a relationship of n3<n1<=n2<n4, and since the light index of refraction n1 of the film substrate 1 is usually about 1.4 to 1.7 as mentioned above, the index of refraction n2 of the dielectric substance thin film 2 is preferably about 1.6 to 2.4, and the index of refraction n3 of the dielectric substance thin film 3 is about 1.3 to 1.6. As a result of formation of these dielectric substance thin films 2 and 3, a flexibility is improved sharply and a good result is obtained also in improvement in a dotting property as touch panels while transparency and scratchproof property of the conductive thin film are mainly improved.

As material of such dielectric substance thin films 2 and 3, for example, inorganic substances [numerical values in () of each material represents a light refractive index], such as; NaF (1.3), $Na_3AlF_6$, (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), $Al_2O_3$ (1.63), $CeO_2$ (2.3), $Nd_2O_3$ (2.15), $Sb_2O_3$ (2.1), $TiO_2$ (2.35), $Ta_2O_5$ (2), $ZrO_2$ (2.05), ZnO (2.1), ZnS (2.3); and organic substances having about 1.4 to 1.6 of the index of refraction, such as acrylics derived resins, urethane derived resins, siloxane derived polymers, alkyd resins, and melamine resins may be mentioned. A suitable material is chosen out of these materials, and is used independently, or two or more of them are used in combination to form the dielectric substance thin films 2 and 3 satisfying the above described indexes of refraction n2 and n3.

Although especially a total thickness of the dielectric substance thin films 2 and 3 is not limited, the thickness is preferably no less than 10 nm in order to obtain a continuous film in the dielectric substance thin film 2. Moreover, when flexibility is taken into consideration, it is more preferably 10 to 3000 nm. In the dielectric substance thin film 3, in order to obtain a continuous film, and to raise transparency and scratchproof property, the thickness is preferably no less than 10 nm, and more preferably 10 to 300 nm, still more preferably 20 to 120 nm. In addition, since there is a possibility that improvement in transparency may not be expected and a crack may arise, an excessive thickness of the dielectric substance thin film 3 is not preferable.

As formation methods of the dielectric substance thin films 2 and 3, a vacuum evaporation method, a sputtering method, an ion plating method, a coating method, etc. may be mentioned, for example, and a suitable method may be adopted according to a kind of the above described material and the film thickness. The dielectric substance thin films 2 and 3 are formed sequentially on the film substrate 1.

After the dielectric substance thin films 2 and 3 transparent are formed as is described above, the transparent conductive thin film 4 is further formed on the dielectric substance thin film 3. As formation methods of the conductive thin film 4, the same technology as in the case of the dielectric substance thin films 2 and 3 may be employable. Thin film materials to be used are not especially limited, and, for example, indium oxide containing tin oxide, tin oxide containing antimony, etc. may be preferably used.

A light index of refraction n4 of the conductive thin film 4 comprising these materials is larger than the light index of refraction n1 of the film substrate 1, and is usually about two. Moreover, these satisfy the above described relationship with the indexes of refraction n2 and n3 of the dielectric substance thin films 2 and 3. That is, the index of refraction of each layer satisfies the relationship of n3<n1<=n2<n4.

Although the thickness of the conductive thin film 4 is not especially limited, in order to obtain the continuous film having a surface resistance no more than $10^3$ ohm/□ and having good conductivity, the thickness is preferably no less than 10 nm. Moreover, since an excessive thickness gives low transparency, especially suitable thickness is about 10 to 300 nm.

A transparent substrate 6 is adhered through a transparent pressure sensitive adhesive layer 5 onto another face of the film substrate 1 on which the transparent dielectric substance thin films 2 and 3 and the transparent conductive thin film 4 are sequentially formed. When the transparent substrate 6 is adhered, the pressure sensitive adhesive layer 5 may be formed on the transparent substrate 6, and subsequently the film substrate 1 may be adhered onto the transparent substrate 6, or conversely the pressure sensitive adhesive layer 5 may be formed on the film substrate 1, and then the transparent substrate 6 may adhered on. In the latter method, formation of the pressure sensitive adhesive layer 5 is performed using a roll-shaped film substrate 1 continuously, and thus an advantage in productivity may be obtained.

As a pressure sensitive adhesive layer 5, if it has transparency, especially it will not be limited, and, for example, acrylics derived pressure sensitive adhesives, silicone derived pressure sensitive adhesives, rubber derived pressure sensitive adhesives, etc. may be used. This pressure sensitive adhesive layer 5 has a function improving scratch-proof property and dotting property as touch panels of the conductive thin film 4 that is prepared on one face of the film substrate 1 by cushioning effect after the transparent substrate 6 is adhered. In order to obtain better demonstration of this function, an elastic modulus is preferably set in a range of 1 to 100 N/cm$^2$, and a thickness is set no less than 1 μm, and usually in a range of 5 to 100 μm.

When the above described elastic modulus is less than 1 N/cm$^2$, since the pressure sensitive adhesive layer 5 has non-elastic character, a deformation is generated easily with pressurization, and then it gives an irregularity on the film substrate 1 and further on the conductive thin film 4. And a fault may occur that a pressure sensitive adhesive overflows from a processed cutting edge, and, moreover, an improvement effect of scratchproof property of the conductive thin film 4, or of dotting property as touch panels may be decreased. If the elastic modulus exceeds 100 N/cm$^2$, on the other hand, since a hardness of the pressure sensitive adhesive layer becomes higher and as a result a cushioning effect is no longer expected, an influence may be given that is not preferable for a scratch proof property of the conductive thin film or a dotting property as touch panels.

Moreover, if the thickness of the pressure sensitive adhesive layer 5 is set to less than 1 μm, since the cushioning effect is not expectable either, an improvement in the scratch-proof property of the conductivity thin film 4 or of the dotting property of as touch panels may not be expected. If the thickness is excessive, transparency will be spoiled or a good result may not be realized in respect of formation of the pressure sensitive adhesive layer 5, and of workability in adhering of a transparent substrate, and cost.

The transparent substrate 6 adhered through such a pressure sensitive adhesive layer 5 gives a good mechanical strength to the film substrate 1, and especially it contributes to prevention of curling etc. When it is required that it should have a flexibility after adhered, a plastic film with a thickness about 6 to 300 μm is usually used, and when especially a flexibility is not required, a glass board and plastics in a shape of a film and a board with thickness of approximately 0.05 to 10 mm are usually used. As material of plastics, the same material as the above mentioned film substrate may be mentioned.

Moreover, if needed, an antiglare processed layer and an antireflection processed layer aiming at improvement in visibility may be prepared or a hard coat processed layer 7 aiming at protection of an outer face may be formed on an outer face (a face opposite to a pressure sensitive adhesive layer side) of the above described transparent substrate 6. As hard coat processed layer 7, curable coat comprising curable type resins, such as melanin derived resins, urethane derived resins, alkyd derived resins, acrylics derived resins, and silicon derived resins, may be used preferably.

Figure 3:
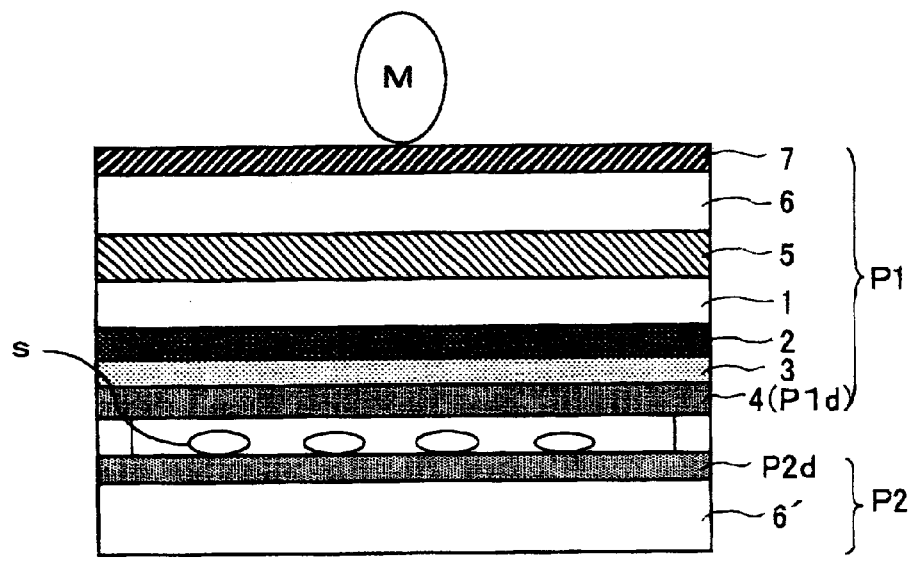
FIG. 3 is a sectional view showing an example of a touch panel of the present invention.

FIG. 3 shows an example of a touch panel using a transparent conductive laminated body (FIG. 2) of the above described present invention. In a touch panel in which a pair of panel boards P1 and P2 having conductive thin films P1$d$ and P2$d$ are configured through the spacer S so that conductive thin films P1$d$ and P2$d$ currently formed in a shape of lines that mutually orthogonal face countered to each other, the transparent conductive laminated body shown in above described FIG. 2 is used as one panel board P1.

This touch panel serves as a transparent switching body structure having a function in which a pressure applied from the panel board P1 side with an input pen M against an elastic force of spacer S has the conductive thin films P1$d$ and P2$d$ contact each other to put an electrical circuit in a state of ON, and if the above described pressure applied is canceled, the electrical circuit is made to return to an original OFF state. In this case, since the panel board P1 is made from the above described transparent conductive laminated body, it has an outstanding scratchproof property and outstanding dotting property as a conductive thin film, and thus the above described function can be stably maintained over a long period of time.

In addition, in FIG. 3, the panel board P1 may be a transparent conductive laminated body shown in FIG. 1. Moreover, in the panel board P2, the conductive thin film P2$d$ is prepared on the transparent substrate 6' comprising plastic film, a glass board, etc., and the same transparent conductive laminated body as the above described panel board P1 shown in FIG. 1 or FIG. 2 may be used.

As mentioned above, according to the present invention, based on a hard effect of the dielectric substance thin film, and a cushioning effect of the pressure sensitive adhesive layer, a scratchproof property of the conductive thin film and a dotting property as touch panels are improved, and moreover a flexibility of the conductive thin film is improved by specific two layers of dielectric substance thin films. Furthermore, a transparent conductive laminated body with improved transparency may be offered according to an antireflection effect based on a combination of the dielectric substance thin film and the conductive thin film, and thus a touch panel using them may be provided.

EXAMPLE

The present invention will be illustrated below using Examples in detail. In addition, a term of part represents a part by weight. A light index of refraction is a value measured using an Abbe refractometer.

Example 1

Formation of a Dielectric Substance Thin Film

On one face of the film substrate 1 (light index of refraction n1=1.66) comprising polyethylene terephthalate film (henceforth referred to as PET film) with a thickness of 25 µm, a dielectric substance thin film 2 with a thickness of 100 nm was formed in which fine-particles of $TiO_2$ (light index of refraction n=2.35) are mixed into a resin of thermosetting type (light index of refraction n=1.54) that comprises melamine resin:alkyd resin:organic silane condensate=2:2:1 (by weight ratio), and a composition ratio was adjusted so that it might make an index of refraction n2=1.68. Subsequently, vacuum evaporation of $SiO_2$ (light index of refraction n3=1.46) was conducted by an electron beam heating method under a condition of $1\times10^{-2}$ to $3\times10^{-2}$ Pa of degree of vacuum to form a transparent dielectric substance thin film 3 (henceforth also referred to as $SiO_2$ thin film) with about 50 nm in thickness.

Formation of a Conductive Thin Film

Subsequently a transparent conductive thin film 4 (henceforth referred to as ITO thin film) comprising a compound oxide (light refractive index n4=2.00) of indium oxide and tin oxide with 30 nm in thickness was formed on the above described $SiO_2$ thin film surface by a reactive sputtering method using an indium-tin alloy in an atmosphere of 0.5 Pa of argon gas 80% and oxygen gas 20%.

Preparation of a Transparent Conductive Laminated Film

On another face of the above described PET film a transparent acrylics derived pressure sensitive adhesive layer 5 (shown below) whose elastic modulus was adjusted to 10 $N/cm^2$ was formed so that it may have a thickness of about 20 µm, and onto this layer the transparent substrate 6 comprising a PET film with a thickness of 125 µm is further adhered to produce a transparent conductive laminated film with a structure as shown in FIG. 1. Pressure sensitive adhesive layer 5 was obtained in a method that isocyanate derived cross-linking agent 1 part was blended to an acrylics derived copolymer 100 part comprising butyl acrylate-:acrylic acid:vinyl acetate=100:2:5 (by weight ratio) to obtain an adhesion material.

Production of a Touch Panel

The obtained transparent conductive laminated film was used as one panel board, and the panel board in which the ITO thin film with a thickness of 30 nm was formed on the glass board by the same method described above was used as a panel board on another side. Both of the panel boards were configured through a spacer with a thickness of 100 µm so that both ITO thin films face countered to each other to produce a touch panel as a switching body structure. In addition, in advance of the above described facing countered configuration, each ITO thin film of both the panel boards was formed so that it might orthogonal mutually beforehand.

Example 2

Formation of a Hard Coat Processed Layer

Hydroxy cyclohexyl phenylketone (Irgacure 184 by Ciba Specialty Chemicals K.K.) as photopolymerization initiator 5 part was added in acrylics-urethane derived resin (UNIDIC 17-806 made from DAINIPPON INK AND CHEMICALS, INCORPORATED) 100 part, and diluted to 50% by weight with toluene to obtain a toluene solution.

After the toluene solution obtained above was applied to one face of a PET film whose thickness is 125 µm and dryed for 3 minutes at 100 degrees C., ultraviolet rays irradiation was immediately performed using two ozone type high pressure mercury vapor lamps (80 W/cm, 15 cm condensing type), and the hard coat processed layer 7 with a thickness of 5 µm was formed.

Production of a Transparent Conductive Laminated Film, Production of a Touch Panel A transparent conductive laminated film of a structure shown in FIG. 2 was produced as in Example 1, except that in Example 1 the PET film with this hard coat processed layer 7 formed thereon was used as a transparent substrate 6 so that the PET film is adhered, through the pressure sensitive adhesive layer 5, from the face opposite to the hard coat processed layer of this transparent substrate 6. Moreover, the touch panel of the structure shown in FIG. 3 was produced as in Example 1 using this transparent conductive laminated film.

Example 3

In Example 1 (formation of a dielectric substance thin film), except that a thickness of the dielectric substance thin film 3 was set 2 µm, a dielectric substance thin film was formed as in Example 1. Subsequent processes were performed as in Example 1, a conductive thin film was formed, and a transparent conductive laminated film was produced. Moreover, a touch panel was produced as in Example 1.

Example 4

In Example 1 (formation of a dielectric substance thin film), a dielectric substance thin film was formed as in Example 1, except that on one face of the film substrate 1 (light index of refraction n1=1.66) a dielectric substance thin film 2 with a thickness of 100 nm was formed in which fine-particle of $TiO_2$ (light refractive index n=2.35) are mixed into a resin of thermosetting type (light index of refraction n=1.51) which comprises melamine resin:alkyd resin:organic silane condensate=2:2:1 (by weight ratio), and a composition ratio was adjusted so that it might make index of refraction n2=1.66. Subsequent processes were performed as in Example 1, a conductive thin film was formed, and a transparent conductive laminated film was produced. Moreover, a touch panel was produced as in Example 1.

Comparative Example 1

In Example 1 (formation of a dielectric substance thin film), except that formation of a dielectric substance thin film 2 was performed by $ZrO_2$ (2.05), a dielectric substance thin film was formed as in Example 1. Subsequent processes were performed as in Example 1, a conductive thin film was formed, and a transparent conductive laminated film was produced. Moreover, a touch panel was produced as in Example 1.

Comparative Example 2

In Example 1 (formation of a dielectric substance thin film), a dielectric substance thin film was formed as in Example 1, except using a PET film with a thickness of 175 µm. Subsequent processes were performed as in Example 1, a conductive thin film was formed, and a transparent conductive laminated film was produced. Moreover, a touch panel was produced as in Example 1.

Comparative Example 3

In Example 1 (formation of a dielectric substance thin film), a dielectric substance thin film was formed as in Example 1, except using a PET film with a thickness of 175 μm and having set thickness of a dielectric substance thin film 3 to 2000 nm. Subsequent processes were performed as in Example 1, a conductive thin film was formed, and a transparent conductive laminated film was produced. Moreover, a touch panel was produced as in Example 1.

Comparative Example 4

In Example 1 (formation of a dielectric substance thin film), a dielectric substance thin film was formed as in Example 1 except having not formed a dielectric substance thin film 2. Subsequent processes were performed as in Example 1, a conductive thin film was formed, and a transparent conductive laminated film was produced. Moreover, a touch panel was produced as in Example 1.

For each transparent conductive laminated film of Examples 1 to 4 and Comparative examples 1 to 4, film resistance, transmittance of light and scratch proof property and flexibility of conductive thin films were measured by the following method. Moreover, dotting property was measured by the following method for each touch panel of the above described Examples 1 to 4 and Comparative examples 1 to 4. Results are shown in Table 1.

Film Resistance

The surface electric resistance (ohm/□) of a film was measured using the two-terminal method.

Transmittance of Light

A visible light transmittance in 550 nm of light wave length was measured using a spectral analysis equipment UV-240 manufactured by Shimadzu Corporation.

Scratchproof Property of Conductive Thin Film

HEIDON surface nature measurement machine TYPE-HEIDON 14 by Shinto Scientific Co., Ltd was used. After the conductive thin film surface was rubbed under conditions of (1) abrasion material: gauze (Japanese Pharmacopoeia type 1), (2) load: 100 g/cm$^2$, (3) abrasion velocity: 30 cm/min., and (4) number of times of abrasion 100 times/(50 round trips), film resistance (Rs) was measured, and a rate of change (Rs/Ro) to initial film resistance (Ro) was obtained, and a scratch-proof property was evaluated.

Dotting property

After 1 million times of center dotting was performed by 100 g of loads from the panel board side constituted by transparent conductive laminated films, using a rod made of polyurethane rubber with hardness 40 (key tip 7R), film resistance (Rd) was measured, and a rate of change (Rd/Rb) to initial film resistance (Rd), and a dotting property was evaluated. In addition, measurement of the above described film resistance was performed about a contact resistance of the conductive thin films configured so that it may face countered to each other when dotting was carried out, and it represented averaged values.

Flexibility

Using a Gardner type mandrel bending tester by Taiyu Equipments Incorporated Company, the sample made to form a rod with a diameter of 7.93 mm was bent by 180 degrees with the electric conduction face outside over about 1 second. This operation was repeated 10 times, and film resistance (Rd) was measured, and the flexibility was evaluated by a rate of change (Rd/Ro) to initial film resistance (Ro).

TABLE 1

| | Film resistance (Ω/□) | Light transmittance (%) | Scratchproof property (Rd/Ro) | Dotting property (Rd/Ro) | Flexibility (Rd/Ro) |
|---|---|---|---|---|---|
| Example 1 | 300 | 90 | 1.2 | 1.0 | 1.0 |
| Example 2 | 300 | 91 | 1.2 | 1.0 | 1.0 |
| Example 3 | 300 | 90 | 1.0 | 1.0 | 1.5 |
| Example 4 | 300 | 90 | 1.2 | 1.0 | 1.0 |
| Comparative example 1 | 300 | 91 | 1.2 | 3.0 | 50 |
| Comparative example 2 | 300 | 89 | 2.0 | 15.0 | 2.0 |
| Comparative example 3 | 300 | 89 | 1.6 | 2.5 | 2.5 |
| Comparative example 4 | 300 | 84 | 60 | 1.0 | 2.0 |

According to results of the above described Table 1, the transparent conductive laminated films of the present invention have good conductivity and good transparency, and conductive thin films are excellent in scratch proof property and flexibility. Moreover, it is admitted that touch panels excellent in dotting property may be manufactured using this transparent conductive laminated film.

What is claimed is:

1. A transparent conductive laminated body comprising a transparent dielectric substance thin film having two layers and furthermore a transparent conductive thin film being formed on one face of a transparent film substrate with thickness of 2 to 120 μm, and a transparent substrate being adhered on another face of the film substrate through a transparent pressure sensitive adhesive layer, wherein a relationship of n3<n1<=n2<n4 is satisfied where a light index of refraction of the film substrate is defined as n1, a light indexes of refraction of the two layers of the dielectric substance thin films are defined as n2 and n3 from the film substrate side respectively, and a light index of refraction of the conductive thin film is defined as n4.

2. The transparent conductive laminated body according to claim 1, wherein the dielectric substance thin film with an index of refraction n2 is an organic substance or a mixture of an organic substance and an inorganic substance.

3. A touch panel in which a pair of panel boards with a conductive thin film are configured so that the conductive thin films face each other through a spacer, wherein at least one panel board comprises the transparent conductive laminated body according to claim 2.

4. The transparent conductive laminated body according to claim 2, wherein the dielectric substance thin film with an index of refraction n2 is an organic substance.

5. A touch panel in which a pair of panel boards with a conductive thin film are configured so that the conductive thin films face each other through a spacer, wherein at least one panel board comprises the transparent conductive laminated body according to claim 4.

6. The transparent conductive laminated body according to claim 2, wherein the dielectric substance thin film with an index of refraction n2 is a mixture of an organic substance and an inorganic substance.

7. A touch panel in which a pair of panel boards with a conductive thin film are configured so that the conductive thin films face each other through a spacer, wherein at least one panel board comprises the transparent conductive laminated body according to claim 6.

8. The transparent conductive laminated body according to claim 1, wherein the dielectric substance thin film with an index of refraction n3 is an inorganic substance or a mixture of an inorganic substance and an organic substance.

9. A touch panel in which a pair of panel boards with a conductive thin film are configured so that the conductive thin films face each other through a spacer, wherein at least one panel board comprises the transparent conductive laminated body according to claim 8.

10. A touch panel in which a pair of panel boards with a conductive thin film are configured so that the conductive thin films face to each other through a spacer, wherein at least one panel board comprises the transparent conductive laminated body according to claim 1.

11. A touch panel in which a pair of panel boards with a conductive thin film are configured so that the conductive thin films face each other through a spacer, wherein at least one panel board comprises the transparent conductive laminated body according to claim 10.

* * * * *